(12) United States Patent
Mercier Des Rochettes et al.

(10) Patent No.: US 9,334,050 B2
(45) Date of Patent: May 10, 2016

(54) ROTARY WING BLADE, ROTOR COMPRISING AT LEAST TWO OF SUCH BLADES AND METHOD TO IMPLEMENT SUCH A ROTOR

(75) Inventors: Hugues Mercier Des Rochettes, Bondues (FR); Léon Buchaniek, Quesnoy-sur-Deule (FR); Didier Joly, Sainghin en Weppes (FR); Jacques Dupas, Lille (FR); Philippe Leconte, Chatillon (FR)

(73) Assignee: ONERA (Office National d'Etudes et de Recherches Aérospatliales), Chatillon (FR)

( * ) Notice: Subject to any disclaimer, the term of this patent is extended or adjusted under 35 U.S.C. 154(b) by 968 days.

(21) Appl. No.: 13/445,702

(22) Filed: Apr. 12, 2012

(65) Prior Publication Data
US 2012/0263590 A1    Oct. 18, 2012

(30) Foreign Application Priority Data

Apr. 13, 2011 (FR) ...................... 11 01126

(51) Int. Cl.
*B64C 27/72* (2006.01)
*B64C 27/473* (2006.01)

(52) U.S. Cl.
CPC ............. *B64C 27/72* (2013.01); *B64C 27/473* (2013.01); *B64C 2027/7216* (2013.01); *Y02T 50/34* (2013.01)

(58) Field of Classification Search
CPC .... B64C 27/473; B64C 27/72; B64C 27/2716
USPC .................... 416/24; 244/99.8, 201
See application file for complete search history.

(56) References Cited

U.S. PATENT DOCUMENTS

| 4,332,525 | A  | * | 6/1982  | Cheney, Jr. ............... 416/134 A |
| 6,076,776 | A  |   | 6/2000  | Breitbach et al. |
| 7,424,988 | B2 | * | 9/2008  | McDonnell ..................... 244/82 |
| 2010/0258680 | A1 | * | 10/2010 | Mercier Des Rochettes et al. ............................ 244/219 |

FOREIGN PATENT DOCUMENTS

| CN | 101 870 359 A | 10/2010 |
| DE | 86 11 677 U1 | 1/1990 |
| DE | 198 59 041 C1 | 3/2000 |
| FR | 2 924 681 A1 | 6/2009 |

OTHER PUBLICATIONS

Preliminary French Search Report from corresponding French Application No. FR 1101126 filed Apr. 13, 2011 (2 pages).

* cited by examiner

*Primary Examiner* — Craig Kim
*Assistant Examiner* — Michael Sehn
(74) *Attorney, Agent, or Firm* — Klein, O'Neill & Singh, LLP

(57) ABSTRACT

The present disclosure is directed to a rotary wing rotor comprising one or more blades. Each blade has a torsion frequency around its span being substantially equal to a rotation frequency ($\Omega$) of the rotor; torsion means twist to the rotation frequency of the rotor, in synchronization with said rotation; and comprising a material configured to dampen the torsion resonance, so as to avoid the resonance divergence.

17 Claims, 5 Drawing Sheets

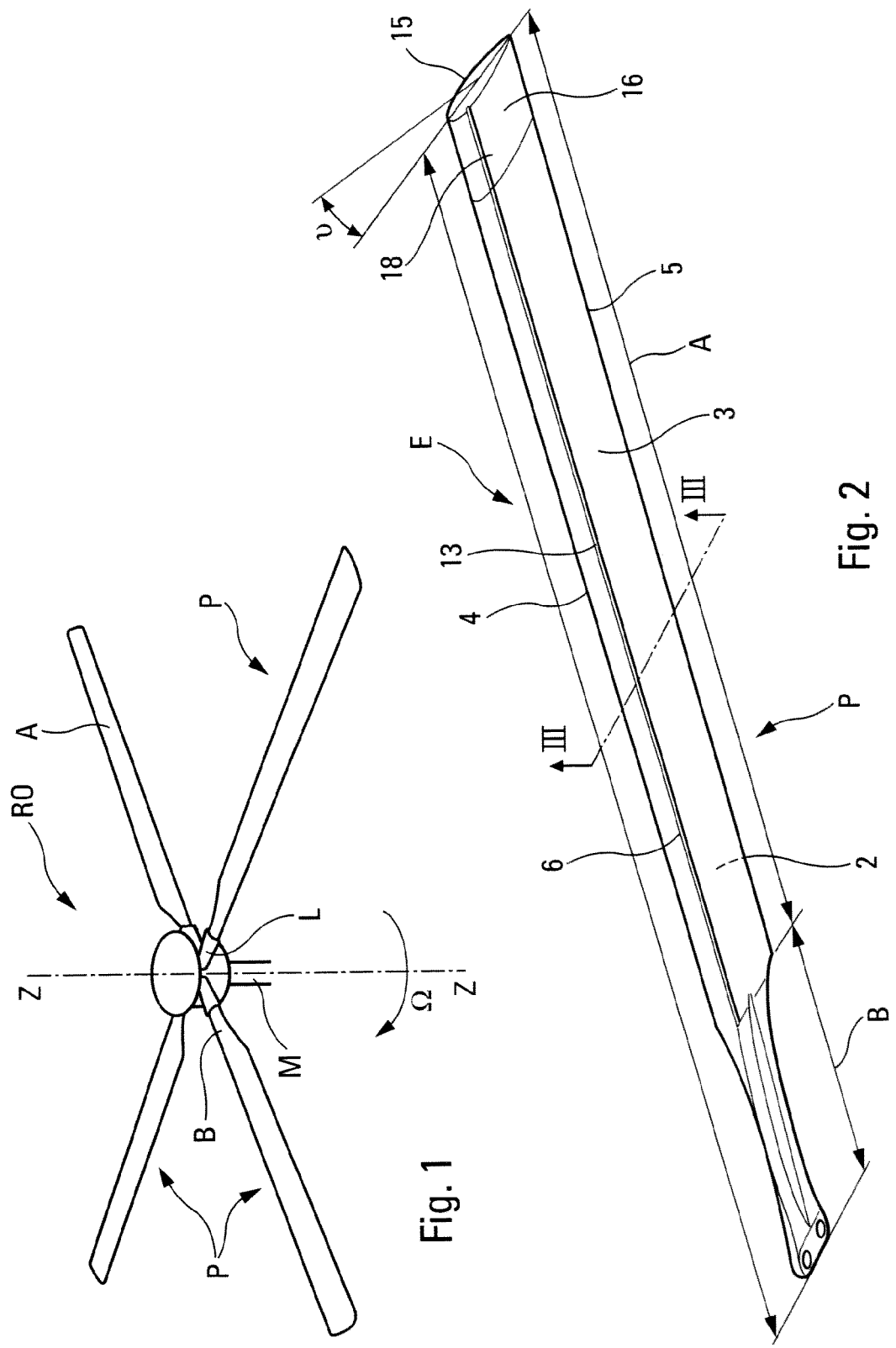

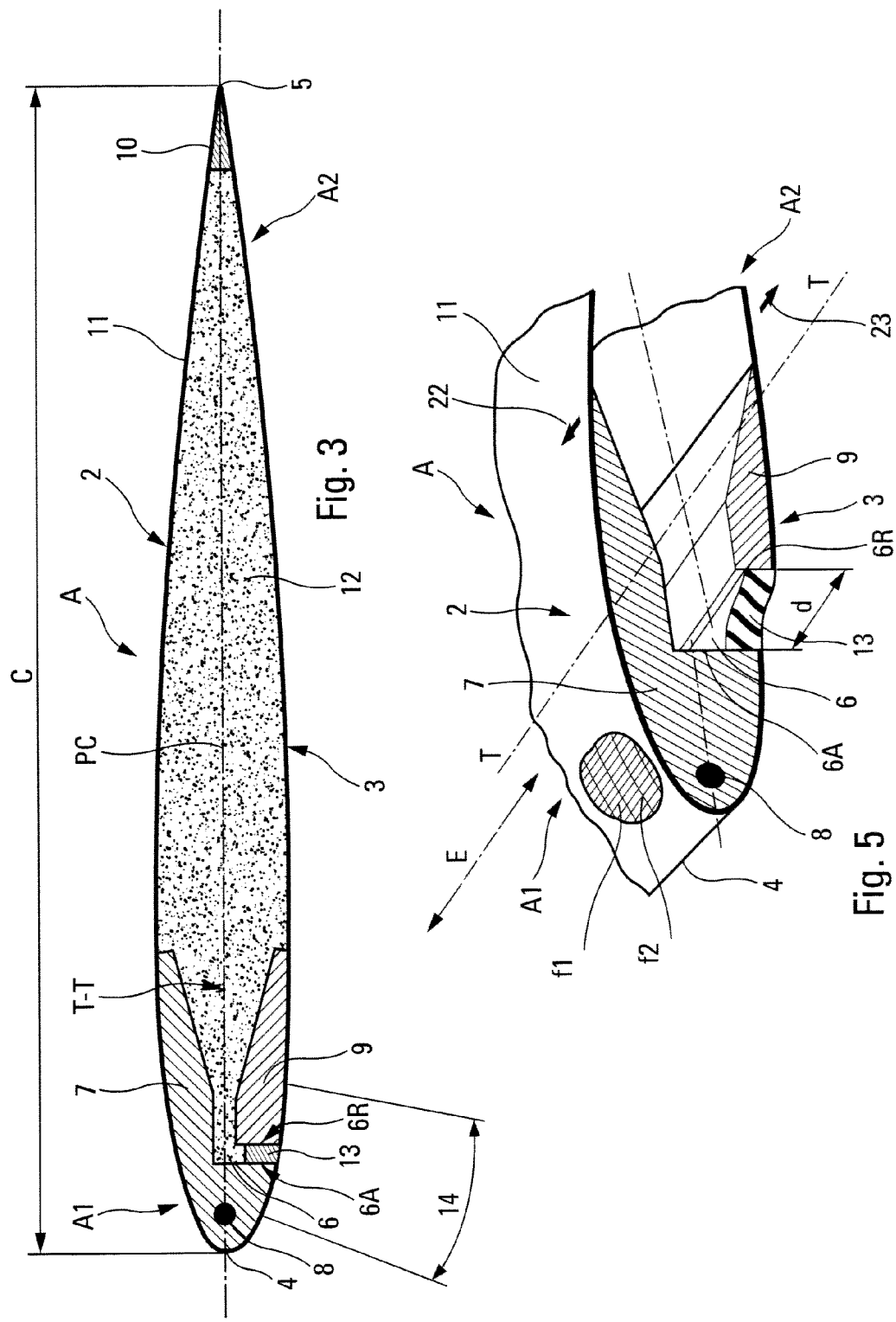

ROTARY WING BLADE, ROTOR COMPRISING AT LEAST TWO OF SUCH BLADES AND METHOD TO IMPLEMENT SUCH A ROTOR

CROSS-REFERENCE TO RELATED APPLICATION

This application claims priority of French Application No. 1101126, filed Apr. 13, 2011, the contents of which are expressly incorporated herein by reference.

FIELD OF ART

The present disclosure relates to the rotary wing rotors, more specifically for helicopters, as well as the blades for such rotors.

BACKGROUND

It is known that the blades of a rotary wing rotor are controlled in a collective pitch and in a cyclic pitch.

The collective pitch allows for the stationary flight of the helicopter through a positioning being identical in incidence to all the blades with respect to the rotation axis of said rotor, then confused with the driving axis for the pylon thereof, said collective pitch generating a general lift being aligned with the vertical and balancing the bulk of the helicopter.

As far as it is concerned, the cyclic pitch allows, through a positioning in incidence for each blade as a function of the azimuth, to tilt the general lift with respect to the vertical and thus to move said helicopter.

For the collective pitch and the cyclic pitch control, rotors generally comprise a mechanism, referred to as a cyclic plate, mounted on the pylon of the rotor and comprising a rotary plate connected to each blade by a pitch control rod and driven in rotation by rotating scissors, a stationary plate sliding along the pylon of the rotor and able to be tilted with respect to the latter and a bearing link between said stationary and rotary plates.

Such a cyclic plate is disadvantageous in that it comprises a large number of mechanical parts requiring it to be regularly maintained and checked.

It has therefore already been contemplated to remove said cyclic plate while mounting mobile flaps on said blades, the cyclic pitch thereof being controlled by the twist of said blades generated by the torsion moment induced by the extension of said flaps and the collective pitch of the blades being obtained either similarly to that of the propellers, or by an actuator arranged at the blade shank.

However, such mobile flaps also require using sophisticated and friction-sensitive mechanical assemblies.

SUMMARY

The present method, system and device comprise a rotary wing blade, a rotor, more specifically for a helicopter, that does not comprise any cyclic plate and an implementing method for overcoming the drawbacks of the prior art, as set forth hereinabove.

The blade, according to the present method, system and device, of a wing rotating around the hub of a rotation frequency rotor, said blade, the rotation azimuth of which is known, of span (E), comprising a fastening part for said hub and an aerodynamic part, and having different distortion modes and, more specifically, a torsion mode around its span (E) with its own frequency, being a function of its torsion stiffness around said span (E), characterized in that:

it comprises dynamic twist means, approximately around its span, being able to be actuated in real time, that is during its rotation around said hub, at least at the rotation frequency of said rotor and in synchronism with the rotation azimuth of said blade, so that these dynamic twist means are able to generate a cyclic pitch even in the absence of a cyclic plate;

its torsion stiffness, apparent under a centrifugal force, approximately around its span, is sufficiently low for allowing for said dynamic twist means to obtain, in the right section plane of the free end of said blade, a resilient dynamic twist angle (v) for the chord of at least 14° as diving or stalling, while remaining sufficiently high so that the own torsion frequency of the blade around its span is equal to the rotation frequency of said rotor, in order to allow for a dynamic twist of the blade through torsion resonance and thus to minimize the energy required for generating the cyclic pitch;

its damping factor, under a centrifugal force, is strictly positive, so as to avoid the resonance divergence of the different modes.

It is to be reminded that it is well known to those skilled in the art that, for obtaining a twist angle with a given amplitude for a mechanical part, they have available a method consisting of adjusting the power of the torsion actuators and a second method consisting of adjusting the stiffness of said mechanical part. The solution implemented in the present method, system and device consists in combining these two methods using a blade being less stiff in torsion than in the state of the art so as to limit the weight of the actuators while having available a twist amplitude of at least 14° as stalling or diving, so as to achieve a cyclic pitch. In the state of the art, different means are known for decreasing the torsion stiffness of a mechanical part such as a blade: it is possible either to longitudinally split the shell of the blade (such as in the patent application of the same Applicant, published under no. FR 2,924,681) or to use structural, filling or coating materials, with a lesser torsion stiffness.

It is also to be reminded that those skilled in the art know, as any mechanic, different means for obtaining a strictly positive blade damping factor. They know, for example, the passive method consisting in adding to the structure of the blade a material with a damping factor higher than 10%, such as for instance rubber abutments at blade shank; or even the active method for an active control of vibrations.

It is further to be noticed that the materials and the structure of the blade are selected so as to be able to withstand twist with an amplitude of at least 14° as diving or stalling and repeated at frequencies able to be as high as several times the maximum rotation frequency of the rotor (case of the multi-cyclic control of the twist for achieving an active control of vibrations) while remaining in the resilient distortion field thereof.

Thus, thanks to the present method, system and device, a rotary wing rotor is obtained, more specifically for a helicopter, easy to be controlled in a cyclic pitch and with a low energy, allowing the cyclic plate to be omitted, while avoiding any coupling between the beat and torsion modes.

It is to be noticed that the flexibility of the blade could result either from that of the fastener, or from that of the aerodynamic part, or from both of them. For instance, when, as known, each one of said blades consists mostly of an aerodynamic part (that having the pitch variation aerodynamically active) connected to the hub of the rotor via a shorter fastening part, the own torsion frequency (as a whole) could be achieved through combining the coefficients of stiffness of said aerodynamic part or said fastening part. Such a combination advantageously allows the corresponding actuator to have available a sufficient torsion angular range for being used in a multicyclic mode.

Advantageously, according to a second embodiment, the present method, system and device comprise a blade according to the previous embodiment, characterized in that said fastening part has an apparent torsion stiffness of 10 to 100 lower than that of the aerodynamic part.

Advantageously, according to a third embodiment, the present method, system and device comprise a blade according to one of the two previous embodiments, characterized in that:

its structure is made in a composite material;
its coating is unidirectional and the direction of such a coating forms an angle substantially equal to 0° with the span of said blade, so as to obtain a minimum torsion stiffness of the blade around the span.

Advantageously, according to a fourth embodiment, the present method, system and device comprise a blade according to one of the three previous embodiments, characterized in that the aerodynamic part is provided with a longitudinal slit in one of its wing bottom or top surfaces and comprises:

a first spar forming the leading edge and the adjacent bottom and top parts thereof and having a longitudinal transversal side forming the front edge of said slit;
a second spar being separated from said first spar by said slit and having a longitudinal transversal side forming the rear edge of said slit;
a shell forming the bottom and top surfaces of said blade, longitudinally slit by said slit and enclosing said first and second spars while being integral therewith;
a filling material for said shell;
the dynamic twist means comprise a dynamic twist actuator able to cause a relative slide, between the edges of said slit; and
said shell is made in a fiber-resin composite material, with at least most part of the fibers being arranged so as to form an angle being substantially equal to 0° with the span of said blade.

Advantageously, according to a fifth embodiment, the present method, system and device comprise a blade according to the previous embodiment, characterized in that on both sides of said slit, in the vicinity of the latter, said shell is rigidly integral with said first and second spars, and in that outside of the vicinity of said slit, said shell is connected to the remainder of said blade via a link made in a resilient material with a damping factor higher than 10%, able to filter the vibrations of the blade, such as an elastomer, and distributed, either continuously or discontinuously, between said shell and said remainder of the blade.

Thus, outside the vicinity of the slit, a (continuous or discrete) link is achieved, with a low resiliency modulus and an adapted damping allowing:

to significantly decrease the torsion stiffness while keeping the beat and drag stiffnesses.
  to minimize the frequency of the first own torsion mode of the blade relatively close to the rotation frequency, and
  to obtain a damping of such a torsion mode, so that the optional coupling with the first beat and drag modes is not an unstable aeroelastic coupling.

On the other hand, in the vicinity of said slit, the stiff link, for example through gluing, ensures a good transmission of the movement of the actuator allowing for an easy twist of the blade.

Advantageously, according to a sixth embodiment, the present method, system and device comprise a blade according to the fourth or the fifth previous embodiment, characterized in that said filling material is a stiff to semi-stiff foam.

This stiff to semi-stiff material enables, on the other hand, to increase vibration filtering (said distortion modes) of the blade.

Advantageously, according to a seventh embodiment, the present method, system and device comprise a blade according to one of the previous fourth to sixth embodiments, characterized in that it comprises a resilient material strip with a damping factor higher than 10%, able to filter the own torsion frequency of the blade, such as, for instance, an elastomer, said strip covering the slit.

Advantageously, according to a eighth embodiment, the present method, system and device comprise a blade according to one of the previous fourth to seventh embodiments, characterized in that the dynamic twist actuator is arranged on the free end thereof, so as to facilitate its installation and its maintenance.

In each blade, the associated actuator could be electric, mechanical or hydraulic. However, preferably, it is of the piezoelectric type, similar to the actuator disclosed in WO 2009/103865.

Whatever its nature, the actuator could be arranged along the aerodynamic part of the blade or on the fastening part thereof.

However, preferably, in each blade, the actuator is arranged on the free end thereof, so as to facilitate its installation and its maintenance.

In addition, it could be advantageous that the profile of each blade is adapted (or even controlled), more specifically as a function of the incidence and of the apparent stiffness of the blade.

Advantageously, according to a ninth embodiment, the present method, system and device comprise a blade according to one of the first to eighth embodiments, characterized in that the dynamic twist means are dimensioned so as to be able to obtain, at the multiple frequencies of the rotation frequency of such rotor and in synchronism with the rotation azimuth of said blade, an amplitude of said resilient dynamic twist angle at least equal, in absolute value, to the maximum amplitude of the different distortion modes at these same multiple frequencies of the rotation frequency, so as to be able to carry out a multicyclic active control of vibrations.

Advantageously, according to a tenth embodiment, the present method, system and device comprise a blade according to one of the first to ninth embodiments, characterized in that its fastening part to the hub comprises means for progressively controlling its own torsion frequency, under a centrifugal force, around its span, able to slave, during its rotation around said hub, said own torsion frequency substantially on the rotation frequency of the rotor.

Advantageously, according to an eleventh embodiment, the present method, system and device comprise a blade according to the tenth embodiment, characterized in that said means for progressively controlling its own frequency, adjust said own frequency while adjusting the torsion stiffness, apparent under a centrifugal force, approximately around its span, of its fastening part.

Advantageously, according to a twelfth embodiment, the present method, system and device comprise a rotor wherein the rotary wing in rotation around its hub at the rotation frequency, included between a lower rotation frequency and an upper rotation frequency, comprises at least two blades, according to one of the previous embodiments, the rotation azimuths of which are known, said rotor being characterized in that it comprises:

means for controlling dynamic twist means of each one of said blades, able, even in the absence of a cyclic plate, to control in real time, that is at a frequency at least equal to the rotation frequency, during the rotation of said blades and in synchronism with their rotation azimuth, a cyclic pitch for each one of said blades;

means for progressively controlling the own torsion frequency, under the centrifugal force, of each one of said blades around their span, able to slave, during this rotation, each own torsion frequency substantially on the rotation frequency of the rotor, so as to take advantage of the torsion resonance around their span so as to minimize the power required for generating a cyclic pitch through a dynamic twist.

Advantageously, according to a thirteenth embodiment, the present method, system and device comprise a rotor according to the twelfth previous embodiment, characterized in that said means for controlling the dynamic twist means are also able, in the absence of a cyclic plate, to control the collective pitch of said blades during the rotation of said rotor.

Advantageously, according to a fourteenth embodiment, the present method, system and device comprise a rotor according to one of the previous twelfth to thirteenth embodiments, characterized in that said means for progressively controlling the own torsion frequency are able to adjust, in both directions, the own torsion frequency, under a centrifugal force, around its span, of each one of said blades, between a minimum value corresponding to the lower rotation frequency of the rotor and a maximum value corresponding to the upper rotation frequency of said rotor, said means being, for instance, means for stiffening the fastening part of each said blade according to any of claims 2 to 10 allowing for the adjustment of the torsion stiffness, apparent under the centrifugal force, of each said blade around its span, between a minimum value corresponding to said stiffness of each blade, not stiffened by said means, and a maximum value corresponding to said stiffness of the aerodynamic part of each said blade.

Advantageously, according to a fifteenth embodiment, the present method, system and device comprise a rotor according to one of the twelfth to fourteenth previous embodiments, characterized in that it comprises spontaneous action means able to impose to each one of said blades, in the case of a failure of said controlling means, that said own frequency under a torsion centrifugal force of each one of said blades is equal to the own torsion frequency under centrifugal force of their aerodynamic part, so as to avoid any torsion resonance divergence for said blades.

Advantageously, according to a sixteenth embodiment, the present disclosure is directed to a dynamic twist method for at least one blade of a wing rotating around the hub of a rotor with a rotation frequency, ranging from a lower rotation frequency and an upper rotation frequency, said blade, having its rotation azimuth known, having a span, comprising a fastening part for said hub and an aerodynamic part, and having different distortion modes, in particular, a mode of torsion around its span with a own frequency, as a function of its torsion stiffness around said span, characterized in that it comprises the following tasks:

controlling in real time by dynamic twist means, that is at a frequency at least equal to the rotation frequency of said rotor, during the rotation of each said blade and in synchronism with the rotation azimuth of each said blade, the resilient dynamic twist angle (v) of the chord in the right section plane of the free end of each said blade, of at least 14° as diving or stalling, so that the dynamic twist means are able to generate a cyclic pitch even in the absence of a cyclic plate;

controlling, using the means, the own torsion frequency, being apparent under a centrifugal force, approximately around the span of each said blade, so that it is substantially equal to the rotation frequency around said rotor and that, consequently, said resilient dynamic twist is achieved with a minimum of power through a torsion resonance; and filtering the own frequencies of the different distortion modes of each said blade, so as to avoid any resonance divergence.

Advantageously, according to a seventeenth embodiment, the present disclosure is directed to a method according to the sixteenth previous embodiment, characterized in that the control of the dynamic twist means is multicyclic, that is at a frequency multiple of the rotation frequency of said rotor, so as to actively control the different distortion modes of said blades in addition to controlling their cyclic pitch.

Advantageously, according to an eighteenth embodiment, the present disclosure is directed to a method according to one of the previous sixteenth to the seventeenth previous embodiments, characterized in that the control of the dynamic twist means controls the collective pitch of said blades in addition to controlling their cyclic pitch.

Advantageously, according to a nineteenth embodiment, the present disclosure is directed to a method according to one of the sixteenth to eighteenth previous embodiments, characterized in that the control of the own torsion frequency, apparent under a centrifugal force, approximately around its span, of each said blade, is obtained through progressively controlling the torsion stiffness, apparent under a centrifugal force, approximately around its span, of the fastening part of each said blade, said fastening part, being more flexible than the corresponding aerodynamic part, being able to be stiffened up to a maximum value equal to the apparent torsion stiffness, around its span, of said aerodynamic part.

Advantageously, according to a twentieth embodiment, the present disclosure is directed to a method according to one of sixteenth to seventeenth previous embodiments, characterized in that it comprises a task, imposin, in the case of a failure of said controlling means, that the own frequency under a centrifugal torsion force of each said blade around its span, is equal to the own torsion frequency, under centrifugal force, of their aerodynamic part around their span, so as to avoid any torsion resonance divergence of said blades.

BRIEF DESCRIPTION OF THE FIGURES

The FIGS. of the appended drawing will better explain how the present method, system and device can be implemented. In these FIGS., like reference numerals relate to like components.

FIG. 1 is a schematic perspective view of a rotary wing rotor of a helicopter.

FIG. 2 is a perspective view, from the bottom surface side, of a blade of a rotary wing rotor of a helicopter according to the present method, system and device.

FIG. 3 is a schematic sectional view of the blade along line III-III of FIG. 2.

FIG. 5 illustrates, on a schematic perspective view, the twisting of the blade of FIG. 2 generated by the blade end actuator shown on FIG. 4.

DETAILED DESCRIPTION

Figure 4:
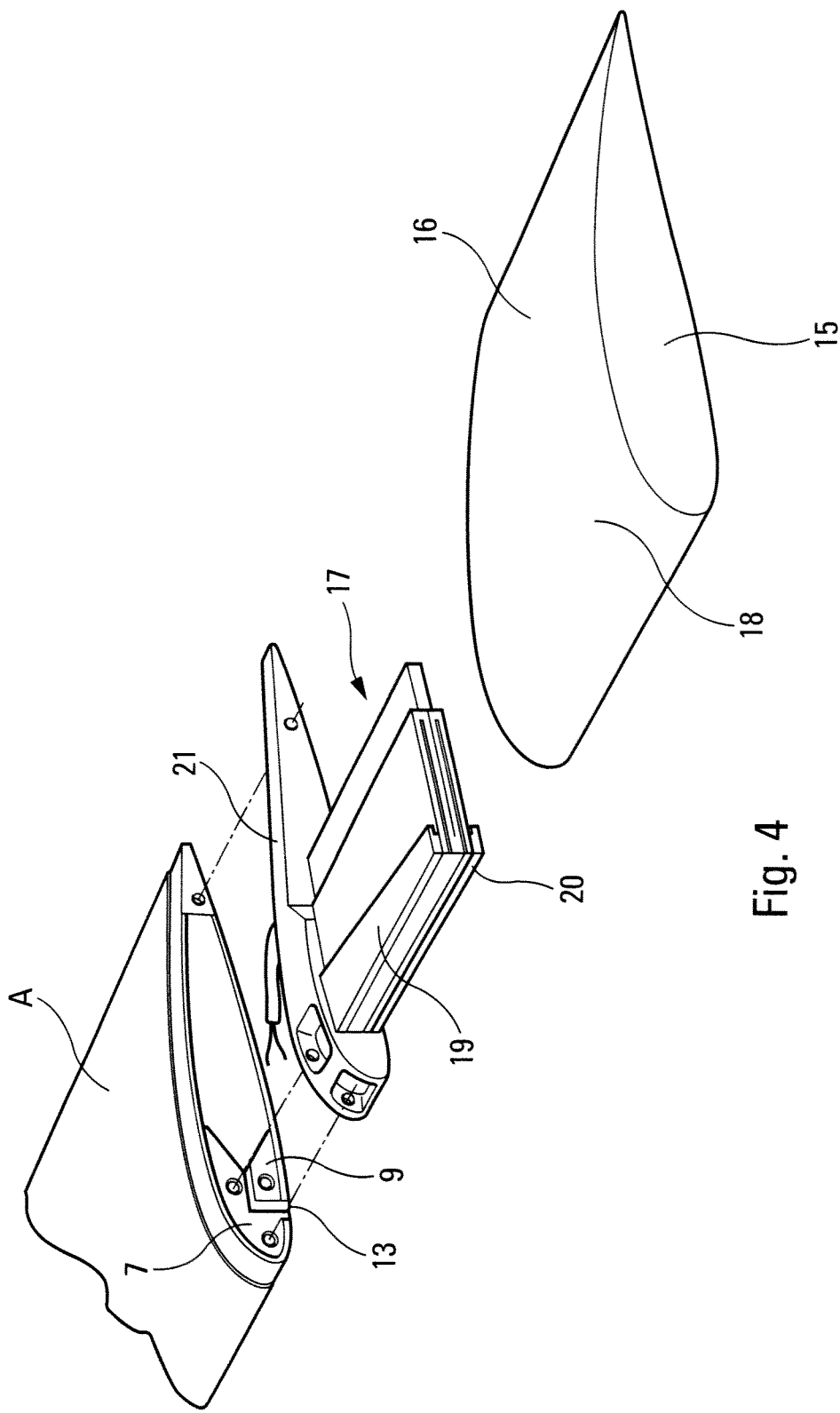
FIG. 4 is an exploded enlarged perspective view of the end of the blade of FIG. 2, seen from the top surface side.

The rotary wing rotor RO for a helicopter, schematically shown on FIG. 1, comprises a hub M driven in rotation around its axis Z-Z by a main gearbox (not shown) and blades P transversally connected to said hub M via fastening devices L. Thus, the blades P could rotate around the axis Z-Z, at the rotation frequency $\Omega$ of said hub M.

As shown on FIG. 2, a blade P according to the present method, system and device comprises an aerodynamic part A and a fastening part B, shorter than said part A.

The fastening part B, for example with a cross-shaped section, cooperates with the fastening device L for fastening the blade P to the hub M.

The aerodynamic part A comprises a top surface 2 and a bottom surface 3 forming, at the front, a leading edge 4 and, at the rear, a trailing edge 5.

In the vicinity of the leading edge 4 (see also FIG. 3), the bottom surface 3 is cut by a longitudinal slit 6 longitudinally distributing said aerodynamic part A (according to the span E) into a front longitudinal part A1 comprising said leading edge 4 and a rear longitudinal part A2 comprising said trailing edge 5. On the other hand, said front A1 and rear A2 longitudinal parts are integrally formed through the top surface 2 being continuous.

In the embodiment shown on FIG. 3, said aerodynamic part A comprises:

a leading edge spar 7, forming said leading edge 4 and the parts of the top surface 2 and the bottom surface 3 adjacent to the latter; such spar 7 can be made in a fiber-resin composite material (for instance glass-epoxy or carbon-epoxy) and possibly incorporate a ballast mass 8 extended according to the leading edge 4;

a bottom surface spar 9, separated from the leading edge spar 7 by the bottom surface longitudinal slit 6, the front edge 6A of the latter being formed by a longitudinal transversal side of the leading edge spar 7 whereas the rear edge 6R of said longitudinal slit 6 is formed by a longitudinal transversal side of the bottom surface spar 9; the latter can also be made in a fiber-resin composite material;

a ridge spar 10 forming the trailing end 5 and, for instance, made in a fiber-resin composite material;

a shell 11 forming the top surface 2 and the bottom surface 3 (interrupted by the slit 6) and enclosing the spars 7, 9 and 10 being simultaneously integral therewith;

a filling material 12, for example, a rigid foam with a low resiliency modulus (for instance, polyurethane) filling said shell 11 between said spars 7, 9 and 10; and a strip 13 of an elastomer material with a low resiliency modulus, obstructing the slit 6 and being integral (preferably with a glue) with the edges 6A and 6B of the latter.

The shell 11 is made in a fiber-resin material (for instance, carbon fibers) and such fibers f1 are arranged longitudinally with respect to said aerodynamic part of the blade, i.e. according to said span E. Possibly, said shell can comprise fibers f2 being orthogonal to said span, but it does not comprise any fiber being tilted on the latter (see the cutaway view of the shell 11 shown on FIG. 5).

Moreover, in an area 14 being adjacent to the slit 6 and extending on both parts of the latter, the shell 11 is rigidly integral (for instance by gluing) with the leading edge spar 7 and said bottom surface spar 9. In contrast, outside the area 14, the shell 11 is connected to the spars 7, 9, 10 and to the filling material 12 by a connecting layer of a damping material with a low resiliency modulus. Such a connecting layer (not shown for clarity reasons in the drawing) can be continuous or discontinuous and be formed with an elastomer material.

It should be easily understood that an aerodynamic part A being little rigid in torsion around the span E is consequently obtained, with however a rigid integrity, located around the slit 6, between the leading edge spar 7 and the bottom surface spar 9, on the one side, and the shell 11, on the other side. By selecting a fastening part B being even less rigid in torsion around the spar than the aerodynamic part A (for instance, 10 to 100 times lower), the blade P is able to sustain a torsion generating on the blade shank, i.e. on the side 15 of the free end 16 of the latter, a resilient dynamic twist angle v of at least 14°.

Furthermore, on the free end 16 of the blade P, an actuator 17 is inserted in the extension of the aerodynamic part A (see FIG. 4). The actuator 17 is piezoelectric and similar to that described in the document EP-1,788,646, as to which it is expressly referred. When the piezoelectric actuator 17 is fastened on the tip of the aerodynamic part A, it is located at least partly in the plane of the chord PC thereof. A removable hood 18 encloses and protects the piezoelectric actuator 17 and the end side 15 of the blade.

The piezoelectric actuator 17 exerts a shear action and comprises two surfaces 19 and 20 being adapted to slide one relative to the other when said actuator is electrically supplied. Through a coupling part 21, the surface 19 is formed integrally with the leading edge spar 7, while the surface 20 is integrally formed with the bottom surface spar 9.

In such a way, as illustrated on FIG. 5, when said actuator 17 is excited, it generates a slide between said surfaces 19 and 20, such sliding being directed according to the span and being transmitted to the spars 7 and 9 moving with each other. Thus, it results in a relative movement between the front part A1 and the rear part A2 (schematically illustrated by the arrows 22 and 23 on FIG. 5) and a buckling of the shell 11 resulting in a torsion distortion of the blade P around the torsion axis T-T arranged in the plane of the chord PC and directed according to the span E. Obviously, the strip 13 also suffers a shear distortion (see FIG. 5).

Figure 6:
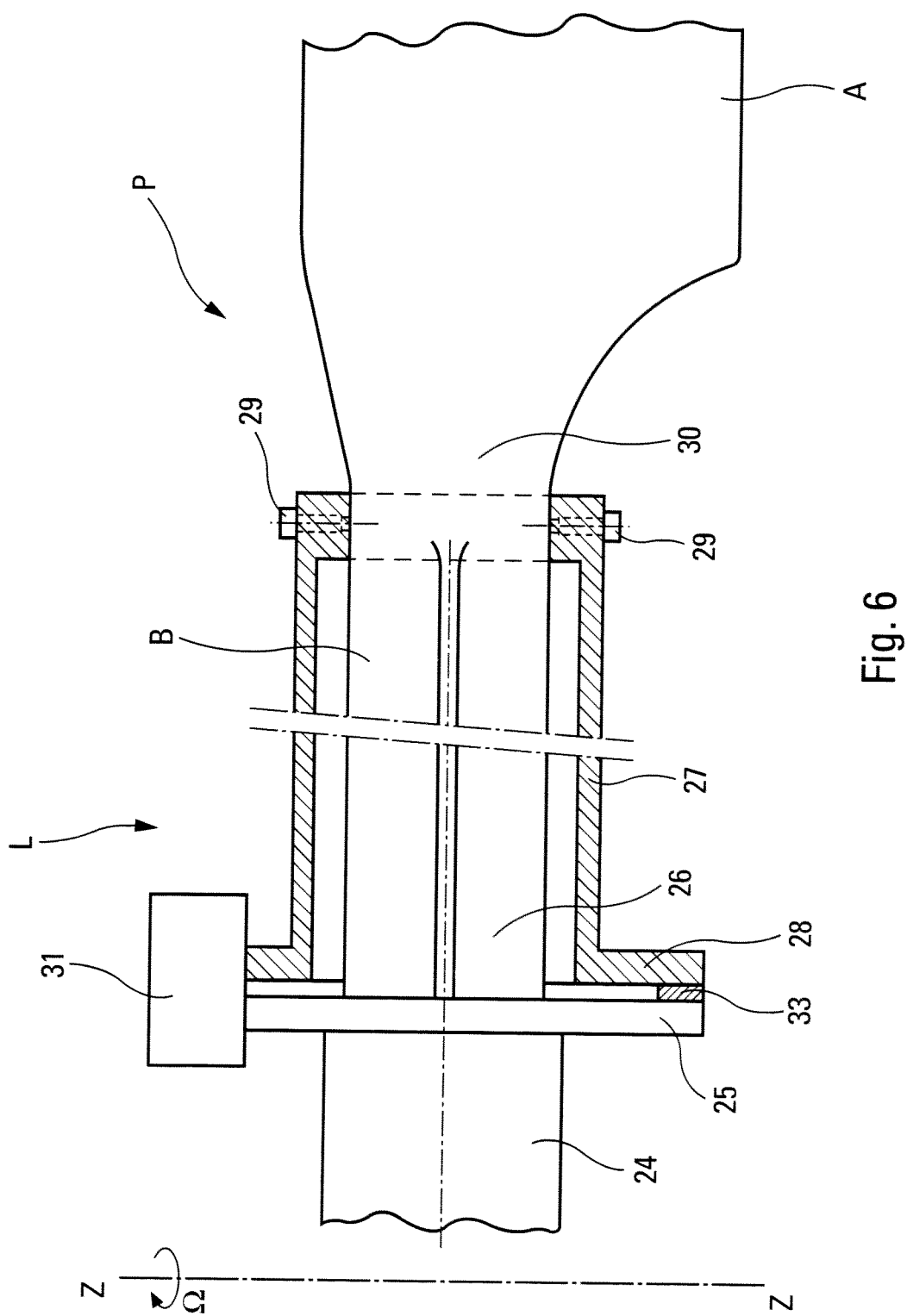
FIG. 6 schematically illustrates controlling means able to progressively adjust the own torsion frequency of each blade of the rotor according to the present method, system and device.

On FIG. 6, an exemplary embodiment is schematically represented for a fastening device L for a blade P so that the latter is able to turn around the axis Z-Z of the rotor RO. In this exemplary embodiment, the fastening device L comprises:

a blade hub 24 made integral of the hub M of the rotor RO by any known means, not shown;

a flange (or flange portion) 25 being integral in rotation, on the one side, with said blade hub 24 and, on the other side, with the internal end 26 of the fastening part B of the blade P;

a rigid sleeve (or sleeve portion) 27 enclosing, with a big play, said fastening part B, said sleeve 27, on the one side, comprising a flange (or flange portion) 28 arranged opposite the flange 25 and, on the other side, being made integral, through fastening means 29, with the blade portion 30 making the transition between the aerodynamic part A and the fastening part B; and at least one device 31 being able to progressively vary the pressure between the flanges 25 and 28.

Figure 7A:
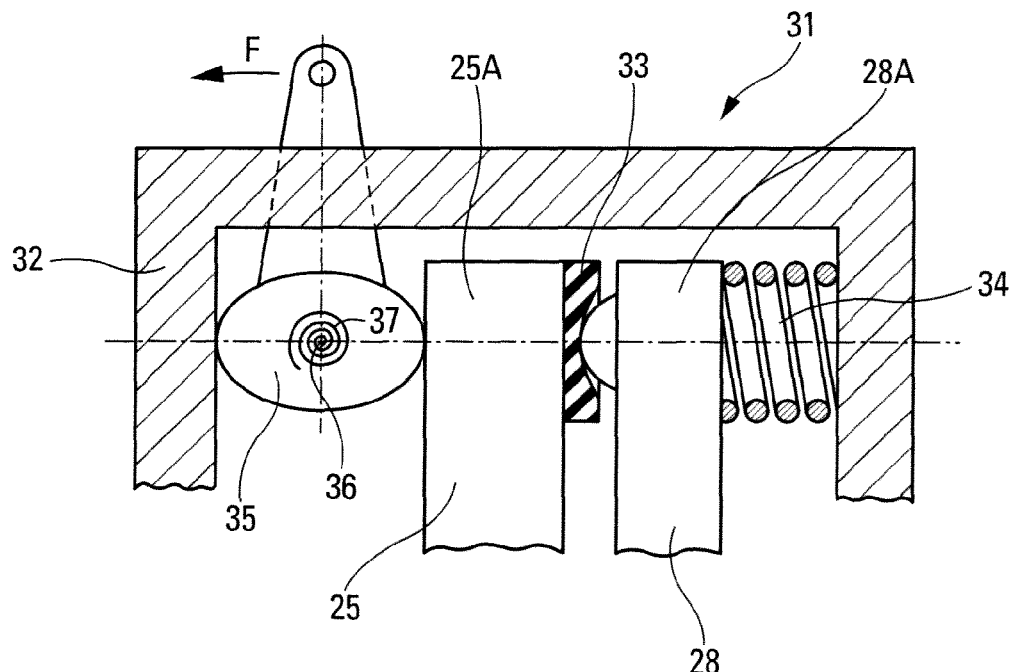
FIGS. 7A and 7B illustrate, in schematic sections, the operation of the controlling means of FIG. 6, the latter being respectively in a position corresponding to locking in a maximum own torsion frequency (FIG. 7A) and to unlocking in a minimum own torsion frequency (FIG. 7B).
Figure 7B:
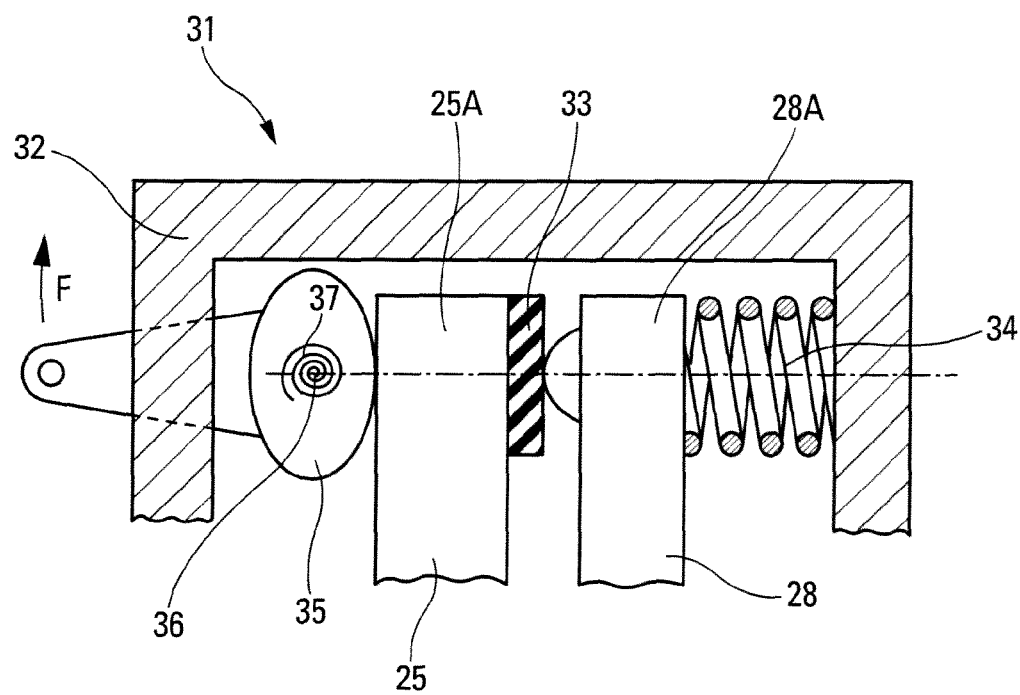

As shown on FIGS. 7A and 7B, the peripheries 25A and 25B of the flanges 25 and 28 being able to suffer a slight resilient distortion, are arranged inside a mobile yoke 32 of the device 31 and being mutually in contact through resilient blocks 33 being interposed between them.

The peripheries 25A and 25B are submitted, on the one side, to the action of a spring 34 and, on the other side, to the action of controllable cam 35, said spring 34 and said cam resting on the mobile yoke 32 so as to exert antagonistic actions on said peripheries 25A and 25B.

The cam 35 is rotationally mounted around an axis 36 mounted on the yoke 31 and can turn around said axis under the control of an actuator represented by arrows F.

A return spring 37 is able to bring the cam 35 into the position of FIG. 7A in the case of a failure of the cam actuator F.

In the situation represented on FIG. 7A, the cam pushes the peripheries 25A and 28A by pushing the spring 34, so that the pressure exerted between the flanges 25 and 28 is big. In such a case, the sleeve 27 is made integral with the blade hub 24 and the twist actuator 17 cannot exert any action on the blade fastening part B, only the aerodynamic part A being able to be twisted. Naturally, it results that own torsion frequency of the blade P is then at a maximum and identical to that of said aerodynamic part A.

In contrast, in the situation represented on FIG. 7B, the spring 34 is expanded and pushes the peripheries 25A and 28A against the cam 35, so that the pressure between the flanges 25 and 28 is weak, even nil. The sleeve 27 is thus disengaged from the blade hub 24 and the twist actuator 17 can exert its action on the whole parts A and B of the blade. The own torsion frequency of the blade P is then at a minimum.

Obviously, through a rotation control of the cam 35 around its axis 36 between the positions illustrated by FIGS. 7A and 7B, it is possible to progressively vary, in both directions, the own torsion frequency on the whole blade comprising the parts A and B thereof and the maximum value corresponding to the own torsion frequency of the sole aerodynamic part A.

Furthermore, it will be noticed that in the case of a failure of the actuator F or the actuator 17, for instance, due to an electrical supplying problem, or even in the case of a divergence in the blade twisting appearing, the return spring 37 brings back to the situation of FIG. 7A, corresponding to the maximum own torsion frequency.

The invention claimed is:

1. A rotor having a rotary wing in rotation around a hub at a rotation frequency ($\Omega$) between a lower rotation frequency and an upper rotation frequency, the rotor comprising at least two blades, each blade having a rotation azimuth of a span (E), a chord, a torsion stiffness and a damping factor, comprises a fastening part for fastening to said hub, an aerodynamic part, and different distortion modes including a torsion mode around the span; having a torsion frequency being a function of the torsion stiffness around said span, wherein:
the blade comprises dynamic twist means approximately around the span for generating a cyclic pitch even in the absence of a cyclic plate, said blade is configured to be actuated in real time during rotation around said hub, at least at the rotation frequency ($\Omega$) of said rotor and synchronized with the rotation azimuth of said blade;
the torsion stiffness of the blade, under a centrifugal force, is sufficiently low to allow said dynamic twist means to obtain, in a planar section of a free end of said blade, a resilient dynamic twist angle for the chord of at least 14° as diving or stalling, while remaining sufficiently high so that the torsion frequency of the blade around the span is equal to the rotation frequency ($\Omega$) of said rotor for allowing a dynamic twist of the blade through torsion resonance; and
the damping factor under the centrifugal force is positive so as to avoid resonance divergence of the different distortion modes; and
means for progressively controlling the torsion frequency under the centrifugal force of each one of said blades around the span (E), and slaving the torsion frequency substantially on the rotation frequency ($\Omega$) of the rotor to take advantage of the torsion resonance around the span.

2. The rotor according to claim 1, wherein said fastening part has a torsion stiffness of 10 to 100 times lower than that of the aerodynamic part.

3. The rotor according to claim 1, made from a composite material and having a unidirectional coating; the coating having a direction at an angle substantially equal to 0° relative to the span of said blade, so as to obtain a minimum torsion stiffness of the blade around the span.

4. The rotor according to claim 1, wherein the aerodynamic part has a longitudinal slit in one of a bottom surface or a top surface and comprises:
a first spar forming a leading edge and adjacent the bottom and top surfaces of the aerodynamic part and having a longitudinal transversal side forming a front edge of said slit;
a second spar separated from said first spar by said slit and having a longitudinal transversal side forming a rear edge of said slit;
a shell forming the bottom and top surfaces of said blade having a slot by said longitudinal slit and enclosing said first and second spars while being integral with said first and second spars; and
a filling material for said shell;
the dynamic twist means comprising a dynamic twist actuator for causing a relative slide between the edges of said slit;
said shell being made of a fiber-resin composite material with at least a majority of the fibers arranged so as to form an angle substantially equal to 0° relative to the span of said blade.

5. The rotor according to claim 4, wherein on both sides of said slit said shell is rigidly integral with said first and second spars, and outside of said slit, said shell is connected to a remainder of said blade via a link made in a resilient material having a damping factor higher than 0.1, the link being configured to filter vibrations of the blade and distributed continuously or discontinuously between said shell and said remainder of the blade.

6. The rotor according to claim 4, wherein said filling material is a stiff to semi-stiff foam.

7. The rotor according to claim 4, further comprising a resilient material strip with a damping factor higher than 0.1, configured to filter the torsion frequency of the blade, said strip covering said slit.

8. The rotor according to claim 4, wherein the dynamic twist actuator is arranged on the free end of the blade to facilitate installation and maintenance of the dynamic twist actuator.

9. The rotor according to claim 1, wherein the dynamic twist means are dimensioned to provide an amplitude of said resilient dynamic twist angle at least equal in absolute value to the maximum amplitude of the different distortion modes at multiple frequencies of the rotation frequency ($\Omega$), to carry out a multicyclic active control of vibrations at multiple frequencies of the rotation frequency ($\Omega$) of the rotor and in synchronization with the rotation azimuth of said blade.

10. The rotor according to claim 1, wherein said means for progressively controlling the torsion frequency are configured to adjust the torsion frequency in both directions under a centrifugal force around the span of each blade, between a minimum value corresponding to the lower rotation frequency of the rotor and a maximum value corresponding to the upper rotation frequency of said rotor, said means being means for stiffening the fastening part of said blade according to claim 2 to allow for an adjustment of the torsion stiffness under the centrifugal force of each blade around the span, between a minimum value corresponding to said stiffness of each blade not stiffened by said means and a maximum value corresponding to said stiffness of the aerodynamic part of each blade.

11. The rotor according to claim 1, wherein said dynamic twist means are further configured for generating a collective pitch even in the absence of a cyclic plate.

12. A blade of a wing rotating around a hub of a rotor having a rotation frequency ($\Omega$), the blade, having a rotation azimuth of a span (E), a chord, a torsion stiffness, and a damping factor, comprises a fastening part for fastening to said hub, an aerodynamic part, and different distortion modes including a torsion mode around the span; having a torsion frequency being a function of the torsion stiffness around said span, wherein:
the blade comprises dynamic twist means approximately around the span for generating a cyclic pitch even in the absence of a cyclic plate, said blade is configured to be actuated in real time during rotation around said hub, at least at the rotation frequency ($\Omega$) of said rotor and synchronized with the rotation azimuth of said blade;
the torsion stiffness of the blade, under a centrifugal force, is sufficiently low to allow said dynamic twist means to obtain, in a planar section of a free end of said blade, a resilient dynamic twist angle for the chord of at least 14° as diving or stalling, while remaining sufficiently high so that the torsion frequency of the blade around the span is equal to the rotation frequency ($\Omega$) of said rotor for allowing for a dynamic twist of the blade through torsion resonance;
the damping factor, under the centrifugal force, is positive so as to avoid resonance divergence of the different modes;
the fastening part comprises means for progressively controlling the torsion frequency under a centrifugal force around the span (E), and slaving said torsion frequency substantially on the rotation frequency ($\Omega$) of the rotor during its rotation around said hub.

13. The blade according to claim 12, wherein said means for progressively controlling the torsion frequency are configured to adjust said torsion frequency while adjusting the torsion stiffness under a centrifugal force around a span of the fastening part.

14. A dynamic twist method for a blade of a wing rotating around a hub of a rotor with a rotation frequency ($\Omega$) ranging from a lower rotation frequency and an upper rotation frequency, said blade having a rotation azimuth, a chord, and a span (E) comprising a fastening part for fastening to said hub and an aerodynamic part, and having different distortion modes including a mode of torsion around the span with a frequency as a function of a torsion stiffness around said span, the method comprising:
controlling in real time by dynamic twist means, at a frequency at least equal to the rotation frequency ($\Omega$) of said rotor during the rotation of said blade and in synchronization with the rotation azimuth of said blade, a resilient dynamic twist angle of the chord in a planar section of a free end of said blade of at least 14° as diving or stalling, so that the dynamic twist means are configured to generate a cyclic pitch even in the absence of a cyclic plate;
controlling a torsion frequency under a centrifugal force approximately around the span (E) of said blade so that the torsion frequency is substantially equal to the rotation frequency ($\Omega$) of said rotor and said resilient dynamic twist is achieved through a torsion resonance; and
filtering frequencies of the different distortion modes of said blade to avoid resonance divergence;
wherein the control of the own torsion frequency under a centrifugal force approximately around the span (E) of said blade is obtained through progressively controlling the torsion stiffness under a centrifugal force approximately around the span of the fastening part of said blade, said fastening part being more flexible than the aerodynamic part, said fastening part being configured to be stiffened up to a maximum value equal to the torsion stiffness around the span of said aerodynamic part.

15. The dynamic twist method according to claim 14, wherein the controlling of the dynamic twist means is multi-cyclic at a frequency multiple of the rotation frequency ($\Omega$) of said rotor to actively control the different distortion modes of said blade and-controlling a cyclic pitch.

16. The dynamic twist method according to claim 14, wherein the controlling of the dynamic twist means is configured for controlling a collective pitch of said blade in addition to controlling a cyclic pitch.

17. A dynamic twist method for a blade of a wing rotating around a hub of a rotor with a rotation frequency ($\Omega$) ranging from a lower rotation frequency and an upper rotation frequency, said blade having a rotation azimuth, a chord, and a span (E) comprising a fastening part for fastening to said hub and an aerodynamic part, and having different distortion modes including a mode of torsion around the span with a frequency as a function of a torsion stiffness around said span, the method comprising:
controlling in real time by dynamic twist means at a frequency at least equal to the rotation frequency ($\Omega$) of said rotor during the rotation of said blade and in synchronization with the rotation azimuth of each said blade, a resilient dynamic twist angle of the chord in the a planar section of a free end of said blade of at least 14° as diving or stalling, so that the dynamic twist means are configured to generate a cyclic pitch even in the absence of a cyclic plate;
controlling a torsion frequency under a centrifugal force approximately around the span (E) of said blade so that the torsion frequency is substantially equal to the rotation frequency ($\Omega$) of said rotor and said resilient dynamic twist is achieved through a torsion resonance; and
filtering frequencies of the different distortion modes of said blade to avoid resonance divergence;
wherein the method further comprises imposing, in the case of a failure of said controlling means, a frequency under a centrifugal torsion force of said blade around its span equal to the torsion frequency under centrifugal force of the aerodynamic part around the span to avoid torsion resonance divergence of said blade.

* * * * *